US008142133B2

(12) United States Patent
Neebe et al.

(10) Patent No.: US 8,142,133 B2

(45) Date of Patent: Mar. 27, 2012

(54) INTEGRATED TRAY CONVERTER

(75) Inventors: Mark Neebe, Catonsville, MD (US); Matthew Good, Marriotsville, MD (US); Charles Miller, Seven Valleys, PA (US)

(73) Assignee: Northrop Grumman Systems Corp., Los Angeles, CA (US)

( * ) Notice: Subject to any disclaimer, the term of this patent is extended or adjusted under 35 U.S.C. 154(b) by 367 days.

(21) Appl. No.: 12/394,599

(22) Filed: Feb. 27, 2009

(65) Prior Publication Data

US 2009/0317224 A1 Dec. 24, 2009

Related U.S. Application Data

(60) Provisional application No. 61/064,318, filed on Feb. 27, 2008.

(51) Int. Cl.
*B65G 59/00* (2006.01)
*B65G 59/06* (2006.01)

(52) U.S. Cl. .......... 414/796; 271/2; 414/797.9; 414/404

(58) Field of Classification Search .................. 271/149, 271/2; 414/331.04, 331.05, 331.08, 331.09, 414/331.1, 331.14, 331.15, 332, 403–405, 414/408–409, 416.03, 419, 425, 796
See application file for complete search history.

(56) References Cited

U.S. PATENT DOCUMENTS

| | | | | | |
|---|---|---|---|---|---|
| 4,503,977 | A | * | 3/1985 | Kohno et al. | 209/564 |
| 4,708,568 | A | * | 11/1987 | Odorici | 414/798.7 |
| 5,993,132 | A | * | 11/1999 | Harres et al. | 414/416.04 |
| 2004/0193554 | A1 | * | 9/2004 | Hillerich et al. | 705/401 |
| 2006/0051195 | A1 | * | 3/2006 | Leblanc et al. | 414/788 |
| 2006/0099065 | A1 | * | 5/2006 | Neebe et al. | 414/800 |
| 2007/0201968 | A1 | * | 8/2007 | Good et al. | 414/265 |
| 2009/0317224 | A1 | * | 12/2009 | Neebe et al. | 414/788.8 |

* cited by examiner

*Primary Examiner* — Gregory Adams

(74) *Attorney, Agent, or Firm* — Rothwell, Figg, Ernst & Manbeck, P.C.

(57) ABSTRACT

A method and system for converting mail between trays in a multiple pass mail sorting system using a plurality of different tray types. Mail from a first type of tray is unloaded and stacked along with mail from other trays to form a large stack. The large stack of mail is then broken down into smaller stacks which are transferred to one of several outputs where the mail is loaded into different types of trays.

14 Claims, 22 Drawing Sheets

INTEGRATED TRAY CONVERTER

CROSS-REFERENCE TO RELATED APPLICATIONS

This application claims the benefit of U.S. Provisional Patent Application Ser. No. 61/064,318, filed on Feb. 27, 2008, the entire disclosure of which is incorporated herein by reference.

BACKGROUND OF THE INVENTION

1. Field of the Invention

The present invention relates generally to mail sorting systems and, more particularly, to a method and system for converting mail between trays in a multiple pass mail sorting system.

2. Discussion of the Related Art

Currently, a variety of automated systems are used to sort flats mail. These automated mail sorting systems reduce cost and increase efficiency. The cost is reduced in automated mail systems by the use of less floor space and less manpower. The efficiency is increased because the time and space required to sort the mail in an automated system is much less than when sorting is performed manually. Some automated mail sorting systems require more than one pass and more than one type of tray in order to sort the mail into a desired sequence, such as carrier route. One of the biggest issues with multiple pass sorting systems is transferring mail back to the input of the sorting system after the first pass (or any pass other than the final pass). Another issue can be the need for multiple, separate systems for feeding the mail back into the sorter or sending mail to dispatch. This can lead to the use of more floor space and all but one of the systems will always not be in use (e.g., when mail is being sent to dispatch the system for sending mail to the sorting system will not be used and visa-versa).

One solution to transferring mail between passes is to use a system that would unload the mail from one tray and place it directly into another. This system does a one-to-one transfer (e.g., mail from the first tray goes directly into the second tray). A one-to-one transfer hurts efficiency, especially in systems where the various types of trays used have different maximum capacities. The efficiency is hurt firstly by the fact that if a tray is only partially filled then the transfer system will still transfer the mail to the next tray without trying to create a larger stack to fill the next tray (e.g., if the first tray has one inch of mail then the second tray will receive one inch of mail). Secondly, the system is limited by the maximum capacity of the smallest tray (e.g., if the tray used for dispatch has a maximum capacity of 15 inches and the tray used for sorting has a maximum capacity of 9 inches, then in a system with one-to-one transfer the dispatch trays will always have at least 6 inches of empty space).

Therefore, a need exists for an improved method and system for transferring mail between trays in a multiple pass mail sorting system.

SUMMARY OF THE INVENTION

The present invention overcomes the disadvantages of the prior art by taking mail from trays output by the sorting system, stacking the mail to a desired depth, transferring the mail into the proper tray type and sending the tray to a desired output (e.g., sorting system input or dispatch). The present invention greatly increases efficiency because it is automated, always in use, takes up less floor space than would be required by two separate systems and allows the trays to be filled to greater capacity than previous systems.

In accordance with a first aspect of the present invention, a method for transferring mail between different styles of tray includes unloading the mail from a first style of tray, stacking mail from the unloader, indexing the mail by separating the mail into smaller stacks and transferring said stacks to one of a plurality of outputs, and loading the stack of mail into a tray.

In accordance with a second aspect of the present invention, a system for transferring mail between different styles of tray includes an unloader positioned downstream of the first tray input, a stacker positioned downstream of the unloader, an indexing apparatus positioned downstream of the stacker, and a controller in communication with said unloader, stacker and indexing apparatus.

In an embodiment, the indexing apparatus has multiple containers which are movable between a plurality of stations. The containers may be spaced such that when one is being loaded other containers are capable of being unloaded. In another embodiment, the indexing apparatus has multiple containers which rotate about an axis of rotation. In another embodiment, the indexing apparatus has multiple containers on a turntable such that when one container is being loaded at least one other container may be unloading. In an embodiment, the stacker is retractable prongs protruding through the surface and pushing the mail so the mail may be made into vertical stacks. In an embodiment, the indexing apparatus separates the mail into stacks by cutting into the unloaded mail with a paddle positioned above the indexing apparatus. The indexing apparatus may separate the mail into even stacks based on the tray the stack will be output to and the total depth of the mail going to the output.

In accordance with a third aspect of the present invention, a system for transferring mail between different styles of tray includes an unloading means for removing mail from the first type of tray, stacking means for accepting mail from the unloading means and stacking it on a ledge, indexing means for separating mail received the stacker means and transferring the stacks of mail to one of a plurality of outputs where the stacks of mail are placed in one of the other types of tray, and a controlling means.

In an embodiment, the system for transferring mail between different styles of tray includes a means for controlling the system. In an embodiment, the means for indexing includes loading the mail into one of a plurality of containers which are movable between a plurality of stations. In another embodiment, the plurality of containers rotate about an axis of rotation. In another embodiment, the plurality of containers are attached to a turntable such that when one container is being loaded at least one other container may be unloading. In an embodiment, the containers have a retractable front wall and a sliding wall to buttress mail in the container. In an embodiment, the container may also have retractable arms positioned on the front of the container so that when the arms are in an extended position mail being input or output is supported by said arms. In another embodiment, the means for stacking is retractable prongs protruding through the surface and pushing the mail so the mail may be made into vertical stacks.

In an embodiment, after all of the mail has been processed for 1$^{st}$ pass, the RCTs are sequenced within the staging area. The RCTs are then sent to one of two ITCs. As the RCTs convey towards ITC, an RCT restacker will restack the mail within the RCT. (Restacking the mail within the RCT before it is unloaded improves the reliability of unloading the RCT.) Once the RCT is processed through the RCT restacker, it is conveyed into the RCT Unloader.

The RCT Unloader clamps the RCT and a set of tines, also called the ram, will actuate down on top of the mail. The ram helps retain the mail stack as the RCT and mail are rotated 30 degrees about the long axis of the RCT. To move the mail out of the RCT, a set of rods extend from underneath the RCT through the slots in the base of the RCT. After the mail is transferred onto the Stacker/Loader, the empty RCT is conveyed into the RCT Lift. The RCT lift is designed so that when an RCT is transferred into lift, another RCT is discharged onto the Empty Tray Return conveyor (ETR) at the same time.

The mail that has been actuated out of the RCT to the Stacker/Loader, is transferred onto the Stacker/Loader ledge by a set of stacker tines that come up through the bottom of the ledge and grasp the mail stack. The mail is then rotated to horizontal by the stacker tines and then slid horizontally along the ledge. While the stacker tines move the mail horizontally, belts on the Stacker/Loader ledge also help move the mail downstream, just like on the AI feeder.

As mail is unloaded from RCTs, the mail is combined on the ledge of the Stacker/Loader. The benefit of combining the mail on the Stacker/Loader ledge is this enables full ACTs or Street Trays to be created by the ITC. However, ITC may be directed by FSS not to combine stacks of mail on the Stacker/Loader ledge. One example of why mail may not be combined on the ITC ledge would be during a Virtual Machine switch. During a Virtual Machine switch, a stack of mail on the Stacker/Loader ledge may need to go to one feeder for processing, while another stack of mail may need to go to a different feeder for processing.

Assuming all the mail is going to the same feeder for processing at this time, once 11 inches (11 inches fills an ACT) of mail is on the Stacker/Loader ledge, the mail is pushed passed the separation area into a transfer box. When 11 inches of mail has been pushed passed the separation area, a gap is created in the stack by the belted ledge. This gap is created as the belts drive the bottom of the mail stack upstream away from the separation area. The portion of the stack that is downstream of the separation area does not move thereby creating a gap in the mail stack. The separator tines then push up through this gap, separating the mail into an 11 inch stack from the larger mail stack on the Stacker/Loader ledge. Once 11 inches of mail is loaded in the transfer box, the indexing table rotates clockwise 90 degrees. This process of separating and loading is repeated until all pass one mail has been processed.

When a transfer box with mail is 180 degrees from the separation position, it is loaded into an ACT.

The indexing table performs two vital tasks for ITC. First, the indexing table orients the mail correctly within the ACT, label facing the door. If the mail was unloaded from an RCT and transferred directly into an ACT, the mail piece labels would be facing towards the back of the ACT. This mail orientation would prevent the infeed line from reading each piece of mails label. The second benefit of the indexing table is to allow parallel processing to occur within ITC thus obtaining a higher throughput. While one transfer box is being loaded, another transfer box will be filling an ACT for $2^{nd}$ pass or the Verticalizer for dispatch.

After the mail stack was separated into 11 inch stacks, the indexing table rotates 180 degrees, in 90 degree increments to the ACT load zone.

After the ACT is filled, it conveys into the ACT justifier. The ACT is clamped into place and is rotated towards the justification wall of the ACT. The ACT then goes through a process of slight vibration to help justify the mail. The ACT conveyed out of the justifier and into the Vertical Position Device (VPD). The VPD is also used during dispatch as the empty Street Tray lift from the Empty Buffer Matrix to the Street Tray conveyor loop. The VPD elevates the full ACT to the Full Tray Conveyor and is sent to the feeders.

In order to create ACTs for $2^{nd}$ pass, ITC needs to be supplied ACTs from the empty tray conveyor. To supply ITC with empty ACTs, an ACT lift is used. The ACT lift is similar to the RCT lift in that when one ACT enters the lift another ACT is discharged to the ACT loader.

The $2^{nd}$ pass automation process continues until all of the $1^{st}$ pass mail has been converted back into ACTs and processed by the feeders for $2^{nd}$ pass, sorted and staged in RCTs prior to dispatch. After all of the $2^{nd}$ pass mail has been processed, the RCTs are sequenced by the TSD into carrier route order. The RCTs are then sent to ITC again where they are processed by the RCT restacker and unloaded by the RCT Unloader. A single carrier's route will be combined on the Stacker/Loader ledge, but this time instead of separating the mail into 11 inch stacks, ITC separates the mail into 15 inch stacks (optimal fill volume for street trays). The 15 inch mail stacks are then pushed into a transfer box on the indexing table. The indexing table then rotates 90 degrees counter-clockwise to help justify the mail to the opposite edge needed by the ACTs. This justification within the indexing table makes loading Street Trays more reliable. Once the transfer box has rotated 270 degrees from the loading zone, the mail is transferred into a rotational box.

The purpose of the rotational box is to 'verticalize' the mail. The verticalized mail is oriented so that when the mail carrier is accessing the mail from the front of the Street Tray, the mail is upside down with the label at the top and the bindings are to the right.

To transfer the mail into the Street Tray, the Street Tray is lifted up below the Rotational Box that has been rotated 90 degrees counter-clockwise from its load position. The bottom of the box (side of the box in the load position) is removed, like a magician removing a table cloth from a set table. The mail then falls a few inches into the Street Tray. The Street Tray is then lowered to the Street Tray Conveyor loop and sent to the Street Tray labeler. The Street Tray labeler applies the label to the tray specifying the contents within the Street Tray.

To supply Street Trays to the Verticalizer, the empty Street Trays enter ITC by the Carrier Automated Street Tray Rack (CASTR) cart. An operator will push a cart loaded with empty Street Trays into the CASTR dock. Once three Street Trays are filled by the Verticalizer and have been labeled, the three full Street Trays convey onto the Vertical Positioning and Pushing Device (VPPD). The VPPD lowers all three Street Trays to the bottom shelf of the cart. The VPPD then pushes the full Street Trays onto the bottom shelf of the cart, which in turn pushes three empty Street Trays onto the Empty Buffer Matrix. The three empty Street Trays are then transferred to the Street Tray conveyor loop by way of the VPD. The empty Street Trays are scanned and oriented correctly before they convey into the Street Tray lift and loaded. Once three more Street Trays are loaded and have a label applied, the VPPD lowers the full Street Trays to the $2^{nd}$ shelf of the cart. Just as with the first shelf, these full trays are loaded on to the cart while pushing empty Street Trays into the Empty Buffer Matrix. This cycle is repeated until the cart is full. The operator is then notified that the cart is full and removes the cart from the CASTR dock. A new cart, full of empty Street Trays, is then pushed into the CASTR dock by the operator to continue the cycle. Mail destined for the same Delivery Unit (DU) can be mixed on a cart, however, different DUs must be placed on different carts.

Other objects and advantages of the present invention will be apparent to those of skill in the art upon review of the detailed description of the preferred embodiment provided herein.

BRIEF DESCRIPTION OF THE DRAWINGS

The accompanying drawings, which are incorporated herein and for part of the specification, help illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION OF THE DRAWINGS

Figure 1:
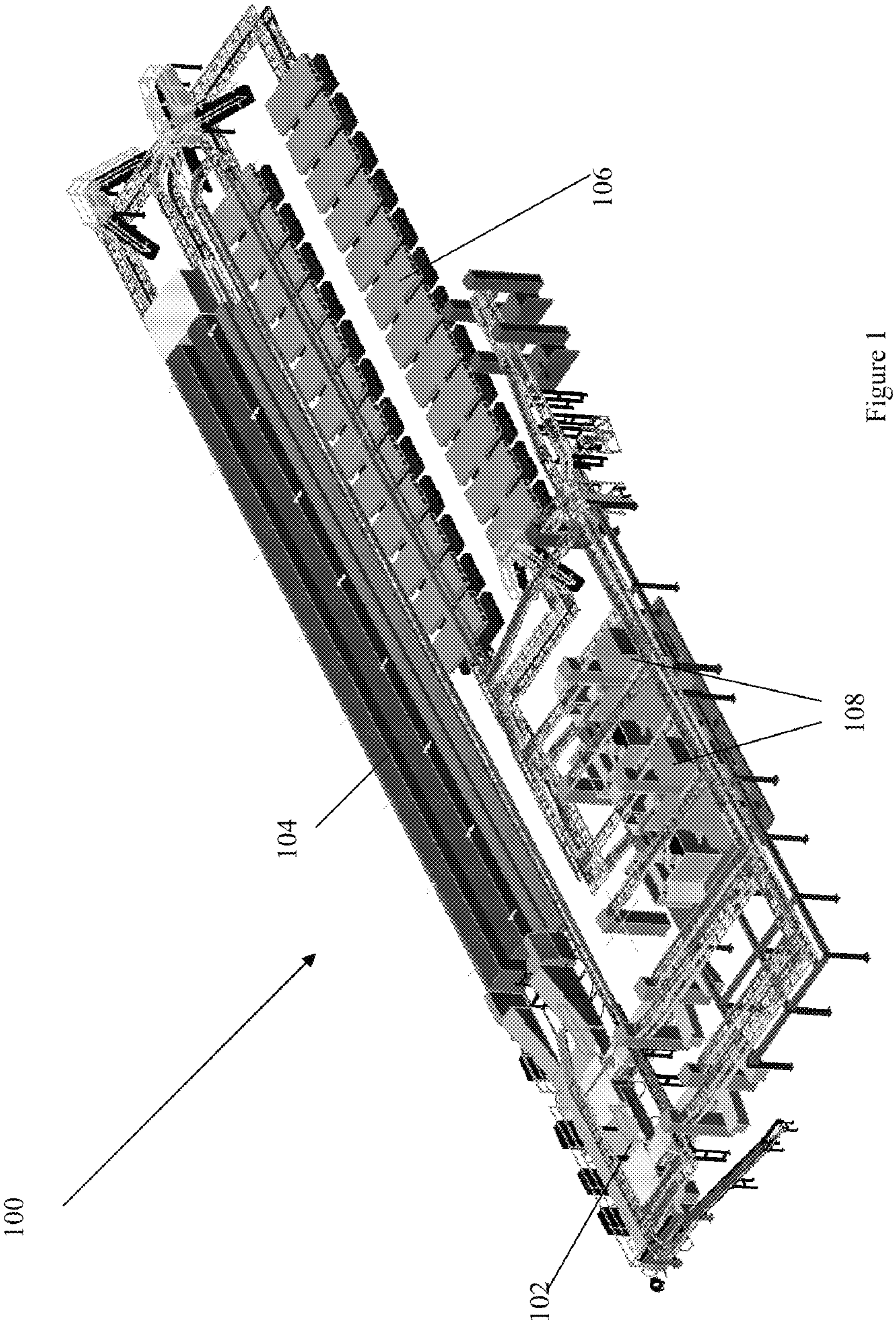
FIG. 1 is a perspective view showing a flats sequencing system incorporating an integrated tray converter according to an embodiment of the present invention.

FIG. 1 shows a flats sequencing system (FSS) 100 for sorting mail into carrier route order according to an embodiment of the present invention. The FSS includes feeders 102, a sorter 104, tray staging devices (TSDs) 106 and integrated tray converters (ITCs) 108. The mail enters the FSS through the feeders 102 in automation compatible trays (ACTs), such as, e.g., the tray disclosed in U.S. patent application Ser. No. 10/927,542, which is incorporated herein by reference. The mail is then sorted a first time in the sorter 104 and placed in rigid tray containers (RCTs). The RCTs are then placed in the TSDs 106. After the first pass, mail is converted from RCTs to ACTs by the ITC 108, and the ACTs enter the sorter 104 for a second pass. The sorted mail is once again loaded into RCTs and placed in the TSDs 106. After the second pass, the ITCs 108 convert the mail from RCTs to dispatch trays, such as the street trays normally used by mail carriers.

Figure 2A:
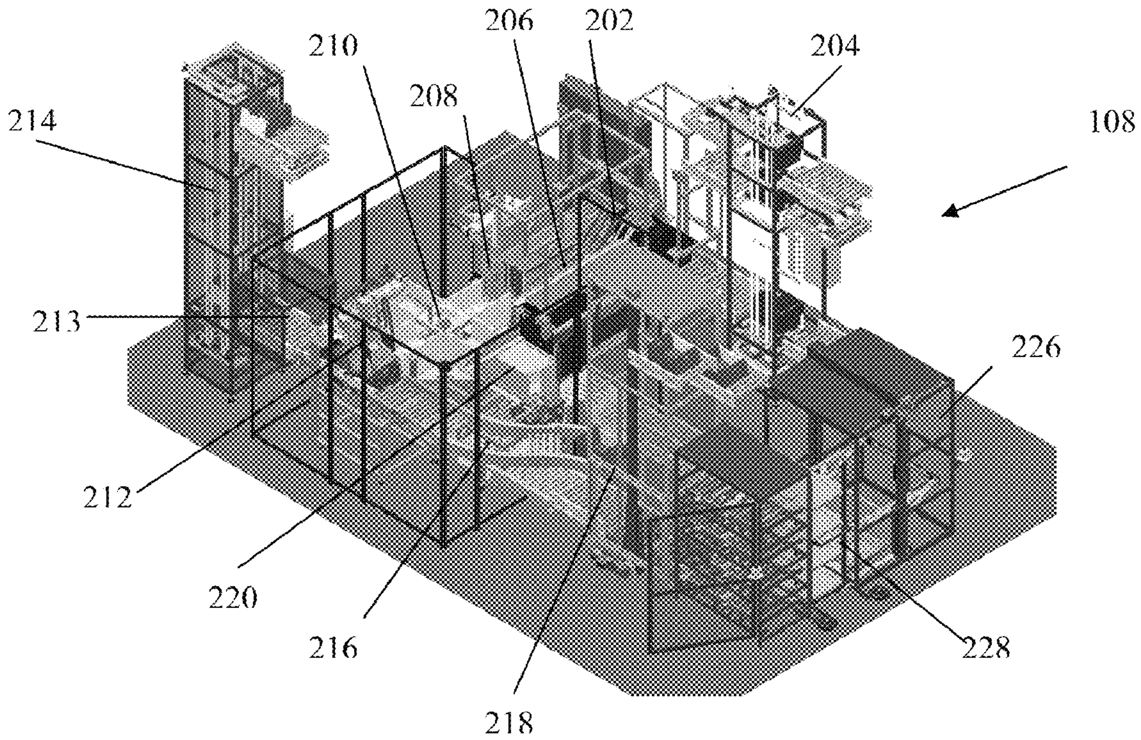
FIGS. 2A and 2B are perspective and top views of an integrated tray converter according to an embodiment of the present invention.
Figure 2B:
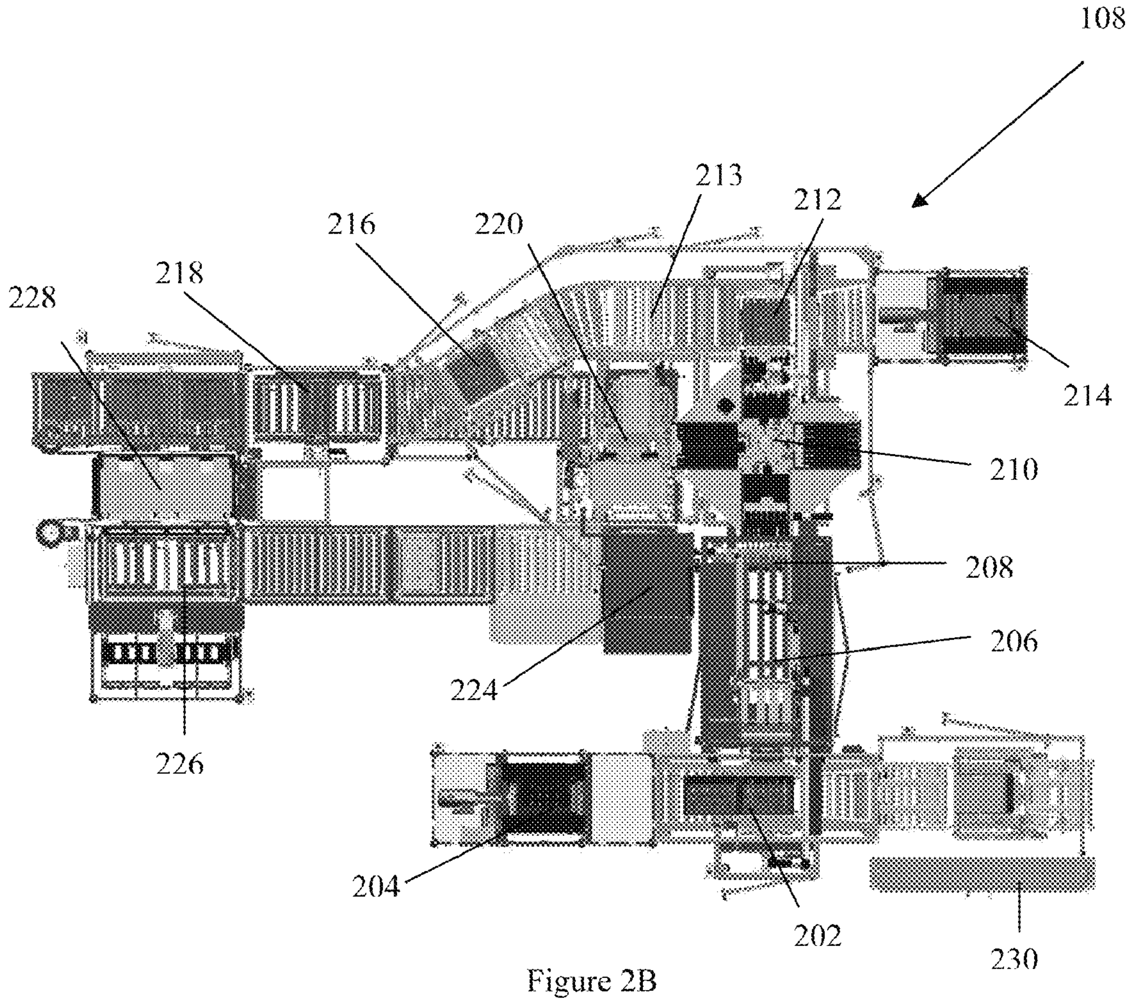

FIGS. 2A and 2B show an integrated tray converter (ITC) 108 according to an embodiment of the present invention. The ITC 108 includes an unloader or RCT unloader 202, a non-automation compatible tray lift or RCT lift 204, a stacker or stacker/loader 206, a transfer paddle 208, an indexing table 210, an automation compatible tray loader or ACT loader 212, an ACT conveyor 213, an automation tray lift or ACT lift 214, a tray justifier or ACT justifier 216, a vertical positioning device 218, a verticalizer 220, a street tray labeler 224, a vertical pushing and positioning device (VPPD) 226, a street tray cart or CASTR cart 228 and a control panel 230.

In operation, mail enters the ITC 108 in an RCT and is transported to the unloader 202 via a roller conveyor or the like. The mail is stacked face down or flat in the RCT in a generally horizontal orientation to form a vertical stack. The unloader 202 removes the mail from the RCT, and the empty RCT is transported to the RCT lift 204. The mail is passed from the unloader 202 to the stacker/loader 206 on edge in a generally upright or vertical orientation. The stacker/loader 206 creates a large horizontal stack of unloaded mail next to the indexing table 210. The transfer paddle 208 is then used to separate the large horizontal stack of mail into smaller horizontal stacks of various depths and transport the smaller stacks to the indexing table 210 on edge in a generally upright or vertical orientation. The indexing table 210 transports the mail to an ITC output leading to the sorting system or to a dispatch output.

In an embodiment, if the mail has made one pass through the system before entering the ITC 108, the indexing table 210 transports the mail to an output leading back to the sorting system. The mail is unloaded from the indexing table 210 by the ACT loader 212. The ACT loader 212 loads the mail into an ACT. Empty ACTs are supplied to the ACT loader 212 by the ACT lift 214. The ACT conveyor 213 transports the filled ACT to the ACT justifier 216 which ensures the mail is properly placed in the ACT. The filled ACT is then transported to the feeders 102 by the vertical positional device 218.

In an embodiment, if the mail has made a final pass through the sorter 104, then the indexing table 210 transports the mail to the ITC output for dispatch. The mail is loaded into the verticalizer 220 from the indexing table 210 in a generally upright or vertical orientation. The verticalizer 220 properly orients the mail by rotating the mail ninety degrees about an axis perpendicular to a face of the mail so the edge that had previously been the bottom edge of the mail is now on the side. The mail is, however, still in a generally upright or vertical orientation. The properly oriented mail is then placed into a street tray. The filled street tray is then labeled by the street tray labeler 224. The labeled street tray is then transported to the vertical pushing and positioning device (VPPD) 226. The VPPD 226 takes three full street trays and transports them to the proper level of the street tray cart 228. As the filled street trays are placed on the cart, empty street trays are supplied to the verticalizer 220.

Figure 3A:
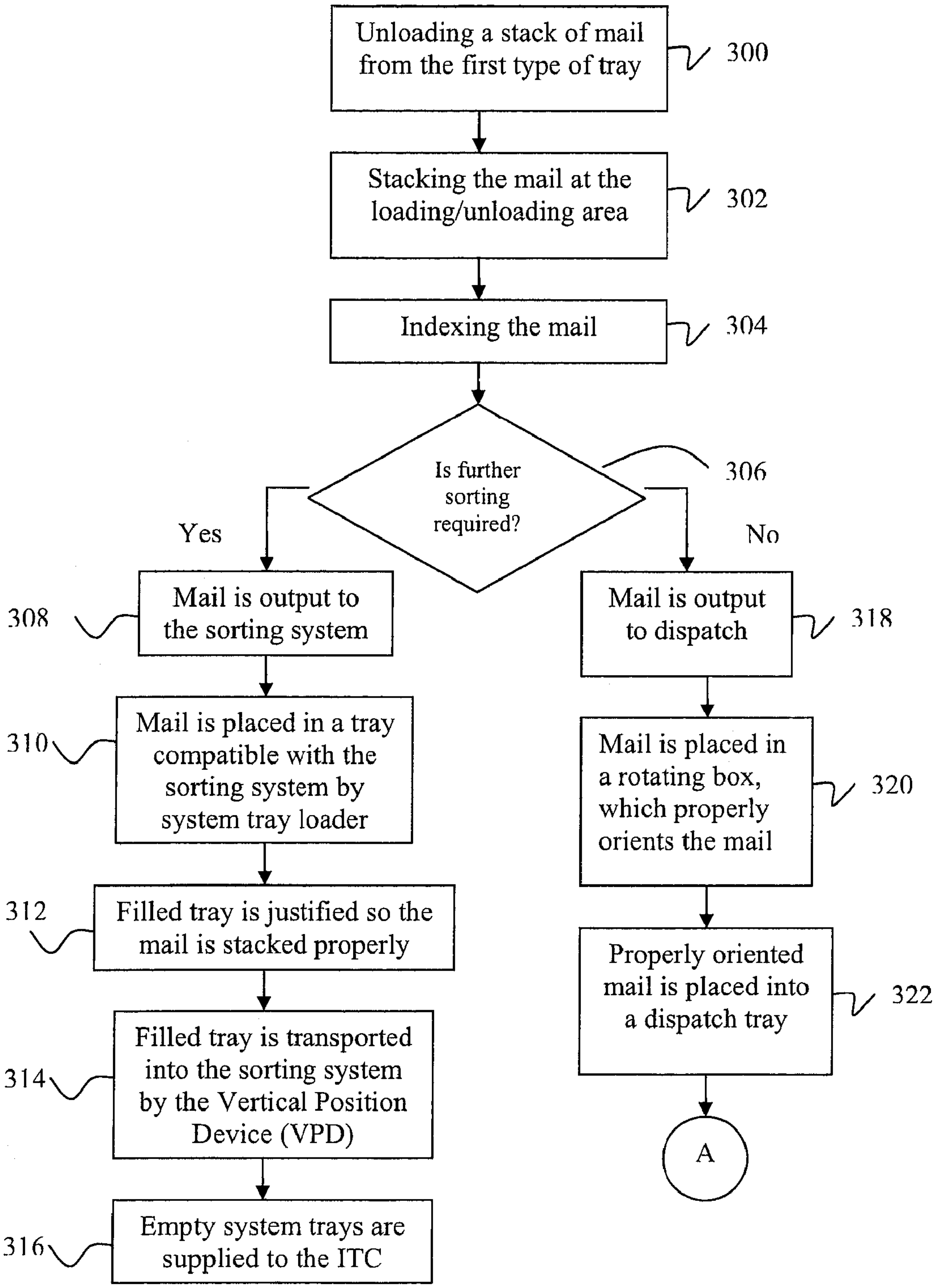
FIGS. 3A-C are flow-charts showing a method for transferring mail from a first type of tray to one of a plurality of different types of trays according to an embodiment of the present invention.
Figure 3C:
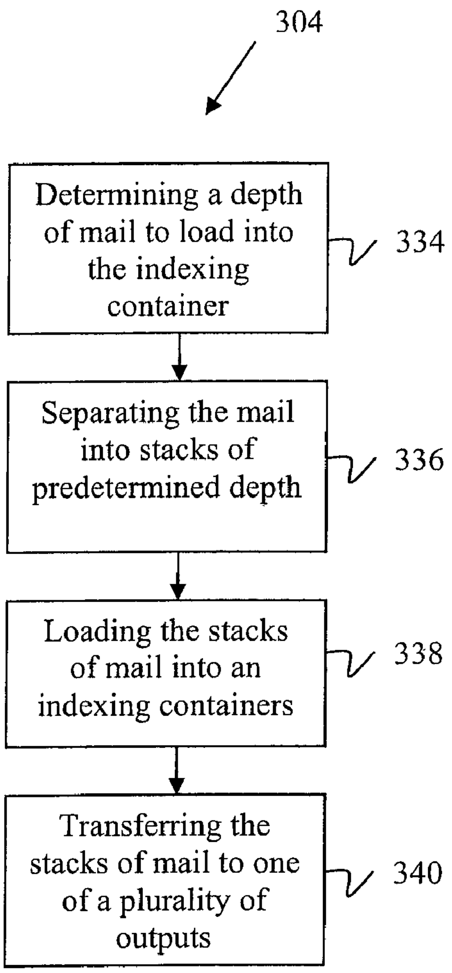
Figure 3B:
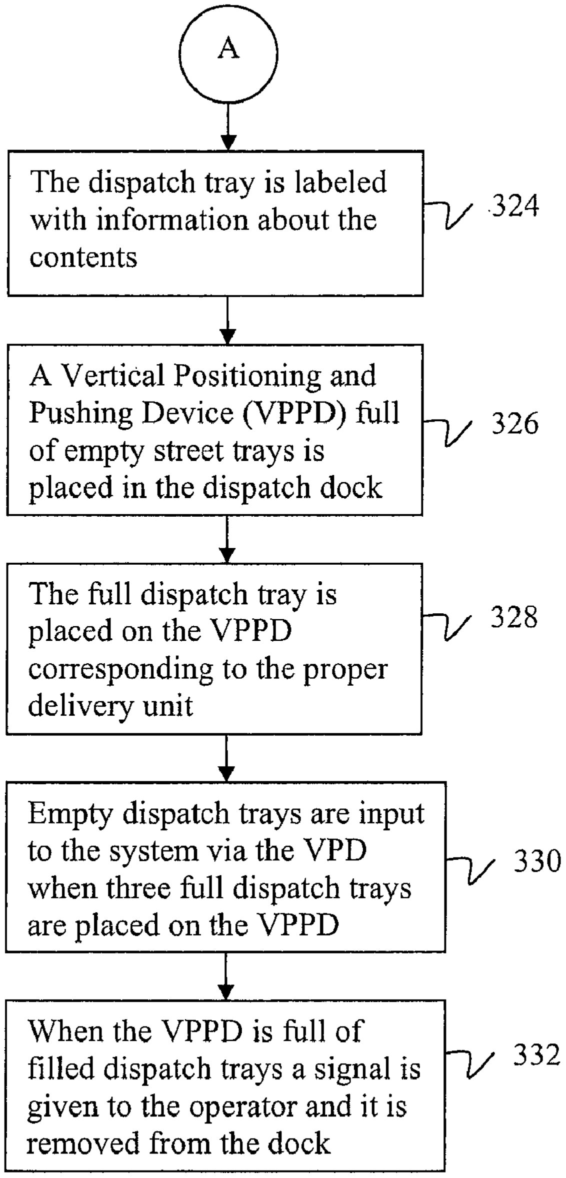

FIGS. 3A-3C are flowcharts showing a method for converting mail between trays according to an embodiment of the present invention. In step 300, a stack of mail is unloaded from a first type of tray, such as an RCT, from the mail sorting system. The unloaded mail is then stacked in a loading/unloading area in step 302. In step 304, the mail is indexed. Referring to FIG. 3C, the indexing step 304 includes determining a depth of mail to be loaded into the indexing container in step 334, separating the mail into stacks of predetermined depth in step 336, loading the stacks of mail into indexing containers in step 338 and transferring the stacks of mail to one of a plurality of outputs in step 340. In step 334, the system determines the depth of mail to load into the indexing container based on information such as the maximum capacity of the destination tray and the size of the total stack of mail going to the tray. For example, the system may determine the smaller stacks should have depths of 10 inches because the mail is going to trays with an 11-inch capacity and there is a large stack of 50 inches. Thus, in this embodiment, the system will opt for 5 10-inch stacks instead of having 4 stacks of 11 inches and one stack of 6 inches. In step 336, the mail is separated into the smaller stacks of predetermined depth by the transfer paddle 208. The transfer paddle 208 then pushes the smaller stack of mail into the indexing container in step 338. The stack is then transported to one of a plurality of outputs in step 340.

Prior to delivering the mail to an output, the system determines if further sorting is required in step 306. If further sorting is required, then the system outputs the mail to the sorting system in step 308. In step 310, the indexed mail is placed in a tray compatible with the sorting system (e.g., an ACT) by the ACT loader 212. The filled ACT is then justified to make sure the mail is properly stacked in step 312. The filled ACT is justified by being clamped into place, rotated and then slightly vibrated. In step 314, the filled tray is transported into the sorting system via the vertical positioning device (VPD) 218. The VPD 218 elevates the filled ACT to a mechanism capable of transporting the filled ACT (e.g., a conveyor) to the feeders 102. As the filled trays are transported out of the ITC, empty system trays are supplied into the ITC by the ACT lift 214 in step 316.

If further sorting is not required, the mail is outputted for dispatch in step 318. The indexed mail is placed in a rotating box or verticalizer 220, which properly orients the mail, in step 320. In an embodiment, the mail is received by the verticalizer with the mail labels on the side of the stack. The stack of mail is rotated 90 degrees about an axis running through the center of the face of the mail in the stack so that the label ends up at the top. The properly oriented mail is then placed into a dispatch tray, in step 322.

Referring now to FIG. 3B, in step 324, the street tray is labeled with information about the contents of the tray. The labeled street trays are then staged in the vertical positioning and pushing device (VPPD) prior to being loaded into a carrier automated street tray rack (CASTR) cart in step 326. When three filled dispatch trays are in the staging area, the filled dispatch trays are placed in the CASTR cart corresponding to the proper delivery unit by the VPPD in step 328. Empty dispatch trays are supplied to the ITC via the VPD when the three filled trays are placed on the CASTR cart in step 330. When the CASTR is full of filled dispatch trays, a signal is given to the operator. The operator removes the full CASTR cart and places a cart full of empty trays in the dispatch dock in step 332.

Figure 4A:
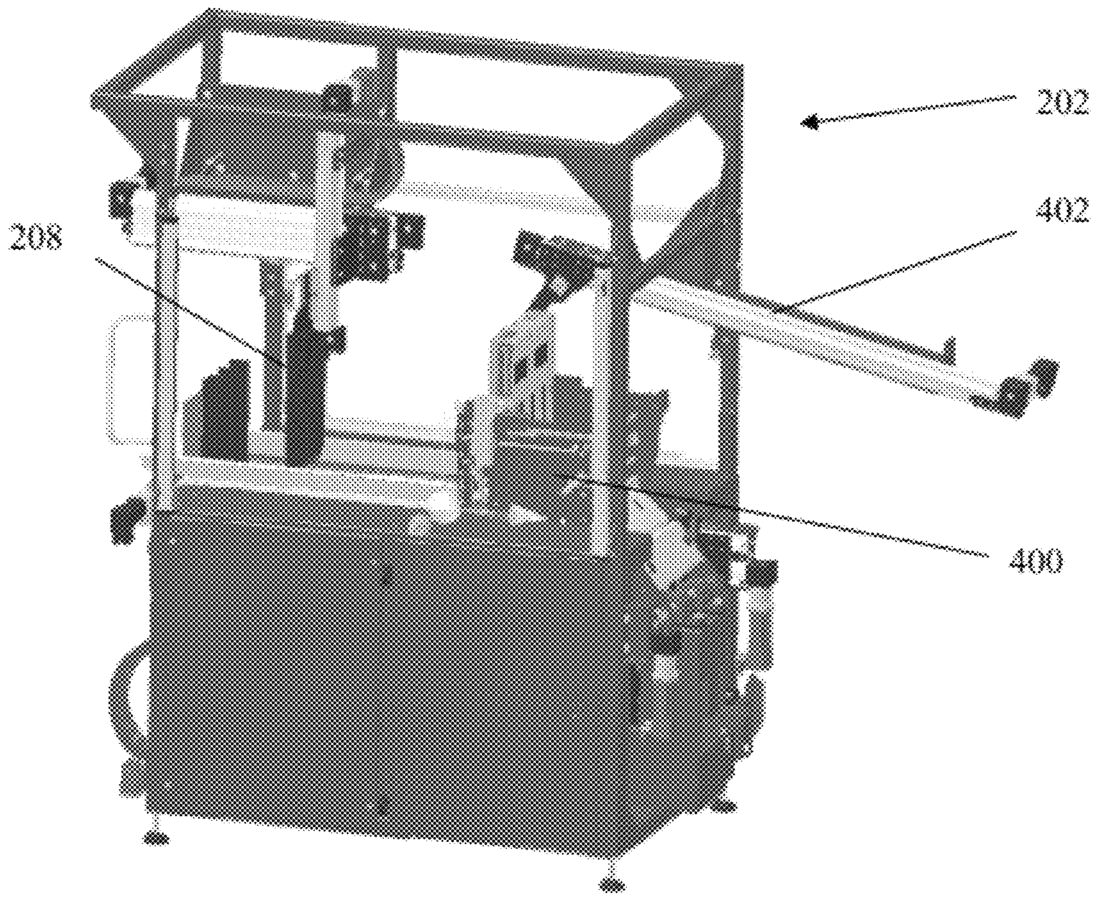
FIGS. 4A-C are perspective views of an RCT unloader for an integrated tray converter according to an embodiment of the present invention.
Figure 4B:
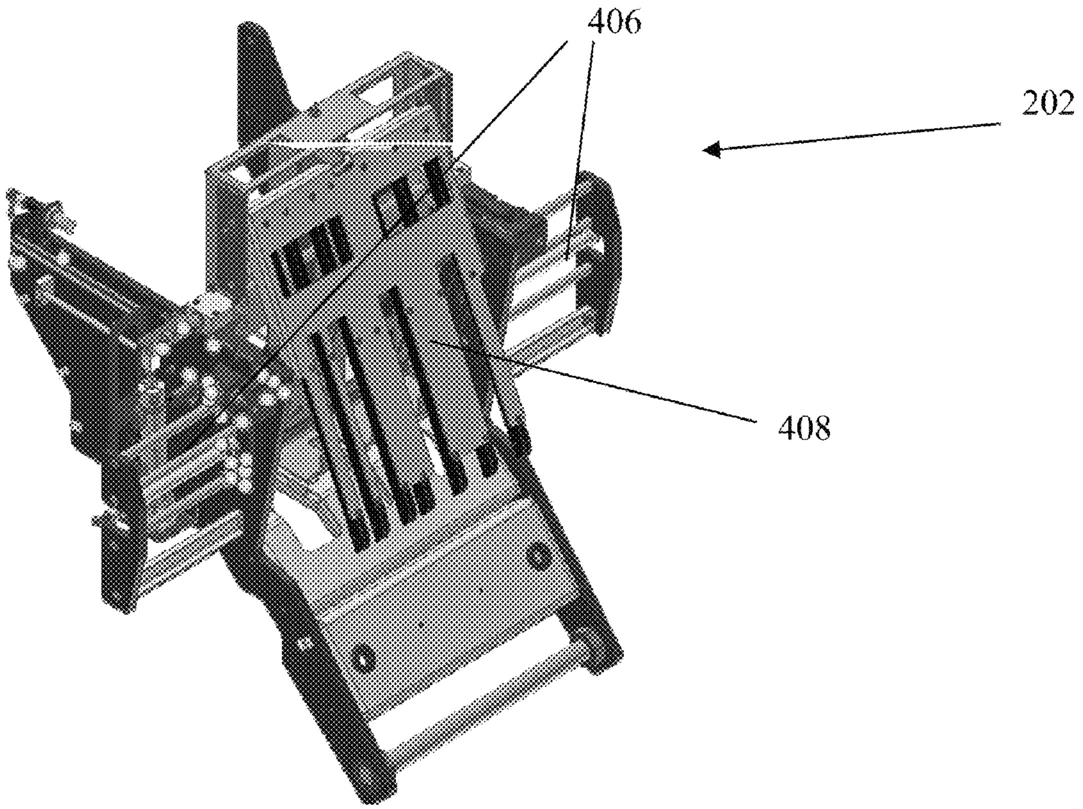
Figure 4C:
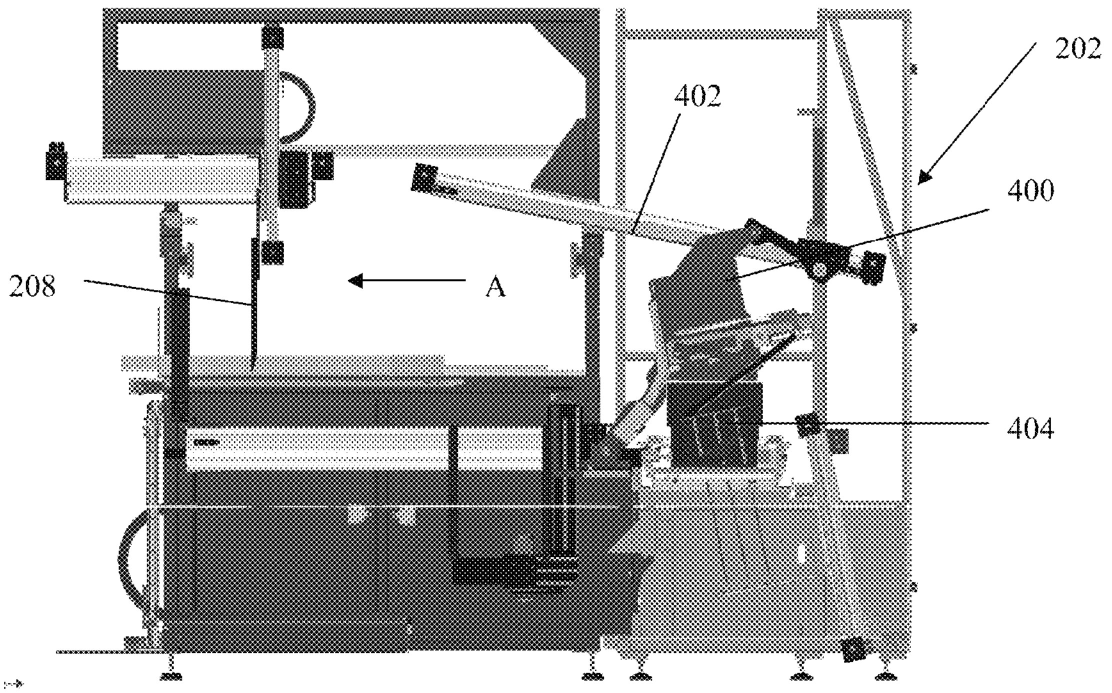

FIGS. 4A, 4B and 4C show an RCT unloader 202 according to an embodiment of the present invention. The RCT unloader 202 includes a rotate box 400, an actuator 402 and an ejector rod 404 (FIG. 4C). The rotate box includes back wall portions 406 and a ram 408. The back wall portions 406 are defined by a plurality of horizontal bars that are slidable between open and closed positions. FIG. 4B shows the back wall portions in an open position. In a closed position, the back wall portions 406 are in front of the ram 408 and form a contiguous back wall. The ram 408 is a plate with groove forming fingers.

Mail in an RCT is transported to the RCT unloader 202 on its face in a generally flat or horizontal orientation. The RCT is properly oriented with respect to the RCT Unloader 202 by an RCT stop and an RCT anti-backup stop of the RCT Unloader 202. Next, the rotate box 400 slides down the actuator 402 and tilts such that an open front of the box is disposed over the RCT. An ejector rod 404 then ejects the mail upwardly from the RCT into the rotate box 400. The ejected mail is pressed against the ram 408. Once the ram 408 has been pushed back by the mail, the back wall 406 closes to hold the mail in place within the box 400. The rotate box 400 then slides back up the actuator with the mail. The rotate box 400 then passes the mail to the stacker/loader 206 as described below.

As discussed above, in an embodiment the RCT anti-backup stop is used with the RCT stop rather than just RCT stop. When there is only an RCT stop the RCT is able to bounce off of the stop. The impact and movement that occur with only an RCT stop can cause the mail to move around within the RCT. The use of the RCT anti-backup stop is advantageous because it keeps the RCT and the mail within it from jostling and becoming disheveled as can happen when there is an RCT stop. The RCT anti-backup stop also has the advantage of properly orienting the RCT with respect to the RCT unloader 202. The RCT anti-backup stop can be equipped with a sensor that signals that the RCT is in the proper unloading position.

Figure 5A:
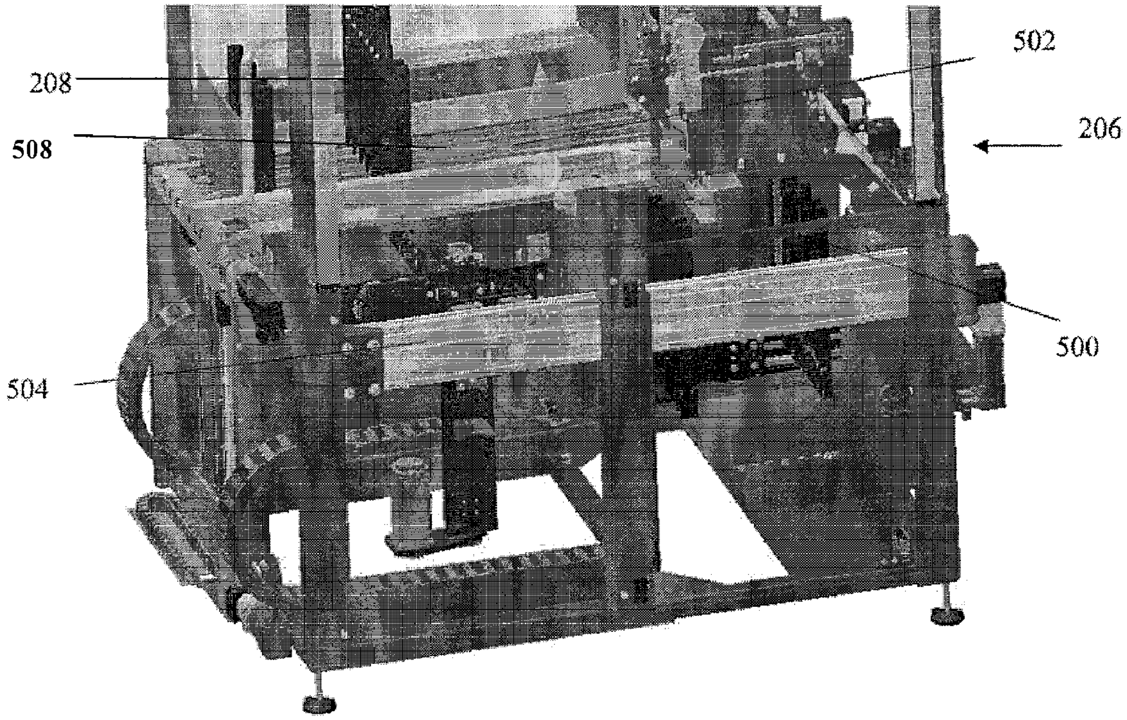
FIGS. 5A and 5B are perspective views of a stacker/loader for an integrated tray converter according to an embodiment of the present invention.
Figure 5B:
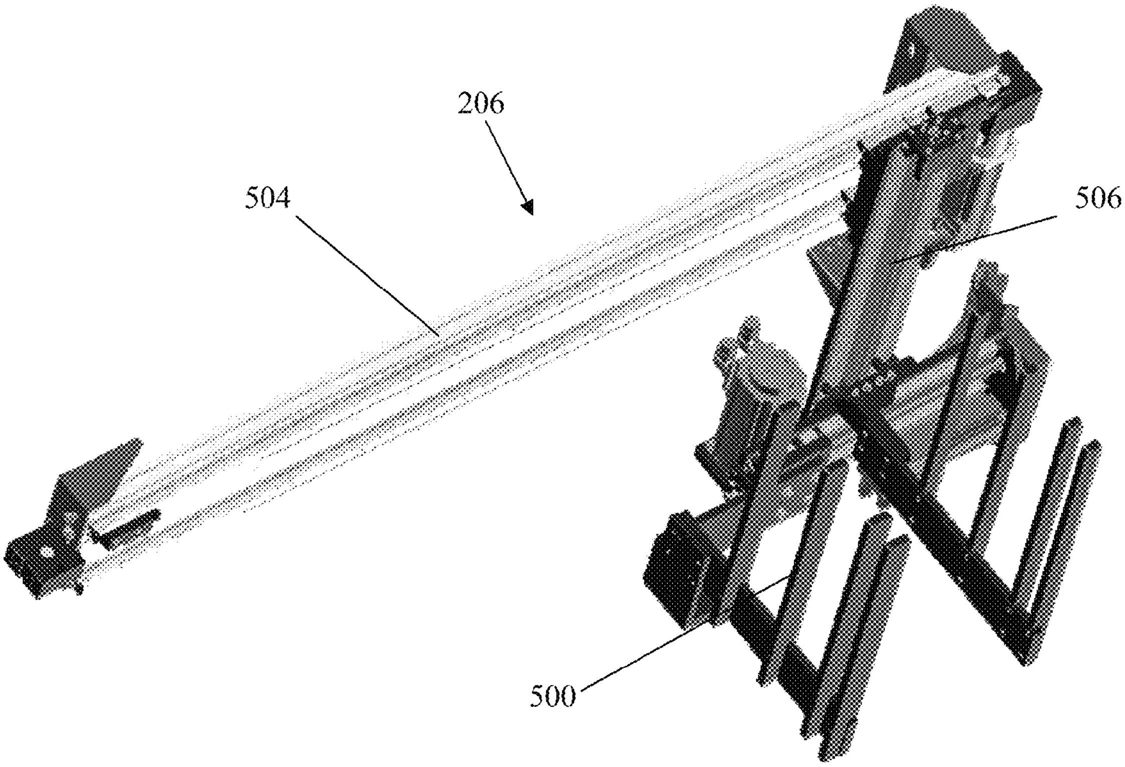

FIGS. 5A and 5B show a stacker/loader 206 according to an embodiment of the present invention. The stacker/loader 206 includes gripper tines 500, a stacker ledge 502, a gripper x-axis actuator 504, a gripper z-axis actuator 506 (FIG. 5B) and a transfer paddle 208 (FIG. 5A and a better view in FIG. 4A). The RCT unloader 202 passes mail from the RCT to the stacker/loader 206. More specifically, when the RCT unloader's rotate box 400 has returned to its original position, the gripper tines 500 are actuated to extend vertically through a plurality of openings 508 in the stacker ledge 502 by the gripper z-axis actuator 506 so as to position the gripper tines 500 on either side of the stack of mail within the rotate box 400. The gripper x-axis actuator 504 then moves the gripper tines 500 and mail along the stacker ledge 502 in the direction shown by arrow A in FIG. 4C, thus stacking the mail. The stacked mail may then be separated into stacks of various depths by the transfer paddle 208 (visible in FIGS. 4A and 4C and partially in 5A).

In an embodiment, the blunt surface on the tip of the transfer paddle 208 can be minimized in thickness to allow the paddle to work its way through the mail stack more easily. This reduces jams and causes the system to work more efficiently in general.

Figure 6A:
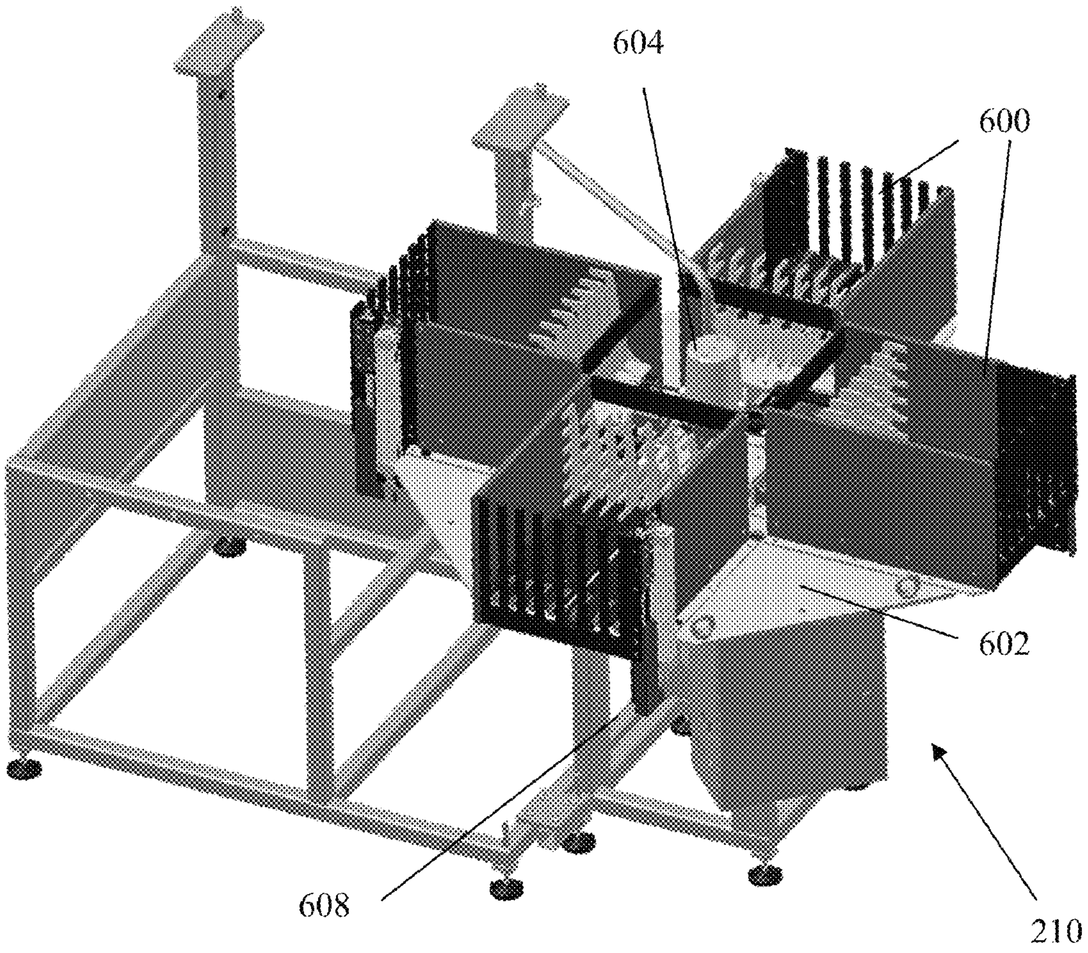
FIGS. 6A and 6B are perspective and bottom views of an indexing table for an integrated tray converter according to an embodiment of the present invention.
Figure 6B:
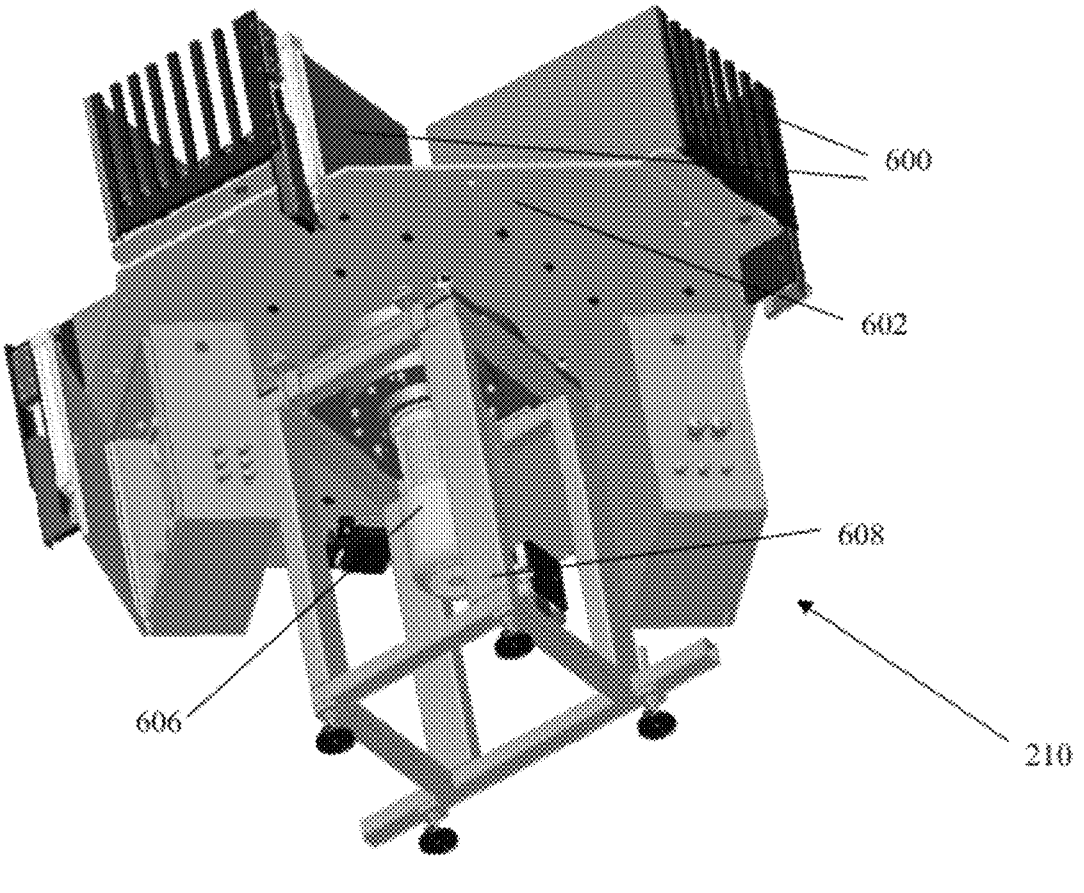

FIGS. 6A and 6B show an indexing table 210 according to an embodiment of the present invention. The indexing table 210 includes a plurality of transfer boxes 600 mounted on a rotating index table or baseplate 602, a slip ring 604, a rotary indexing actuator 606 and an indexing table frame 608. Mail is transferred from the stacker/loader 206 to one of the transfer boxes 600 of the indexing table 210 by movement of the transfer paddle 208. In an embodiment, the depth of the stack of mail transferred to the transfer box 600 is determined by a computerized control system of the ITC based on the intended output (e.g., stacks of no more than maximum capacity of an ACT (e.g., 11 inches) if going back to the system and no more than the maximum capacity of a street tray (e.g., 15 inches) if going to the dispatch output) and the total depth of mail going to the output. The index table 210 includes multiple transfer boxes 600 attached to an indexing table baseplate 602. The indexing table baseplate 602 is rotatable about a central vertical axis by an indexing actuator 606. The indexing actuator 606 rotates the transfer boxes 600 from the input (the position at the stacker/loader 206) to one of a plurality of outputs. In an embodiment, the transfer boxes 600 are placed such that when one transfer box 600 is at the input position being loaded with mail another transfer box 600 is at an output position unloading mail.

In an embodiment, the mounting feet of the indexing table 210 are placed in a trapezoidal pattern (as can be seen in FIG. 6B). The trapezoidal pattern provides greater stability as the indexing table 210 rotates.

Figure 7A:
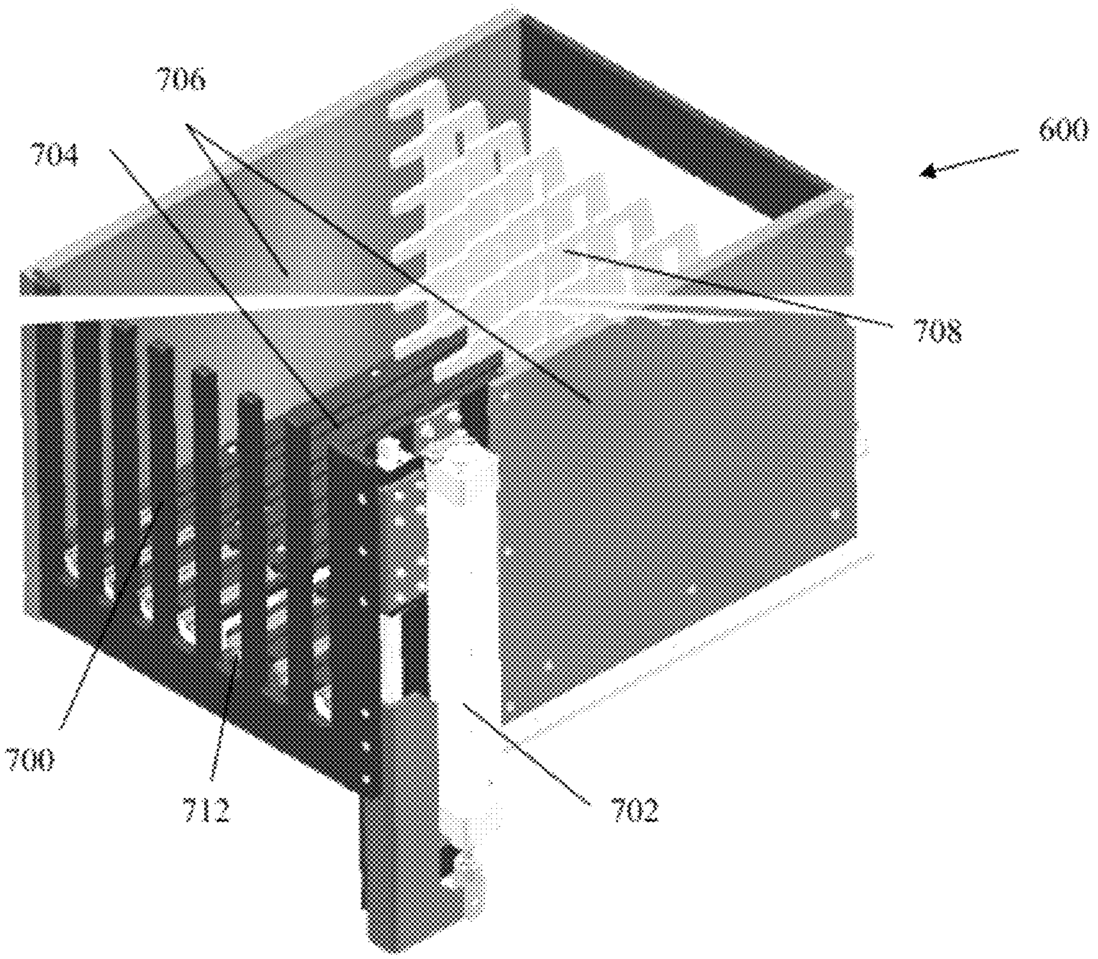
FIGS. 7A-7C are perspective views of a transfer box for an integrated tray converter according to an embodiment of the present invention.
Figure 7B:
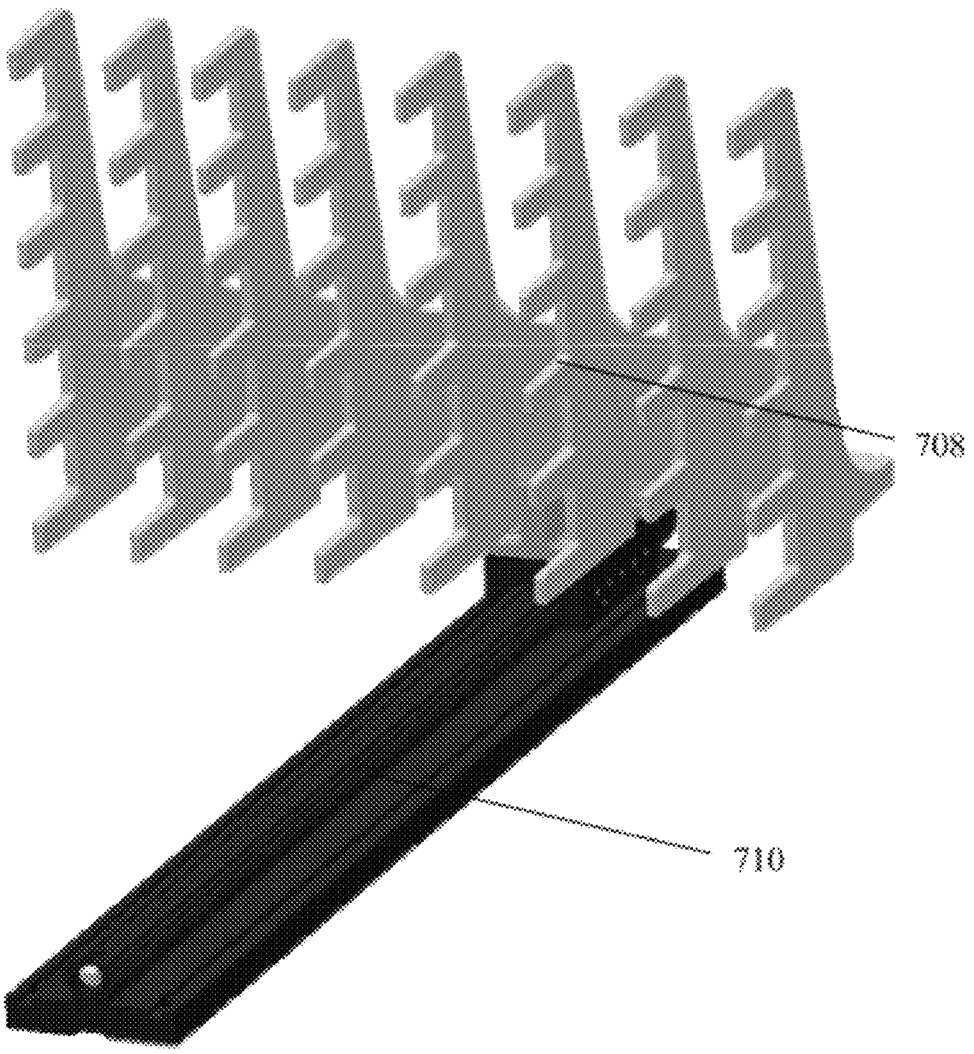
Figure 7C:
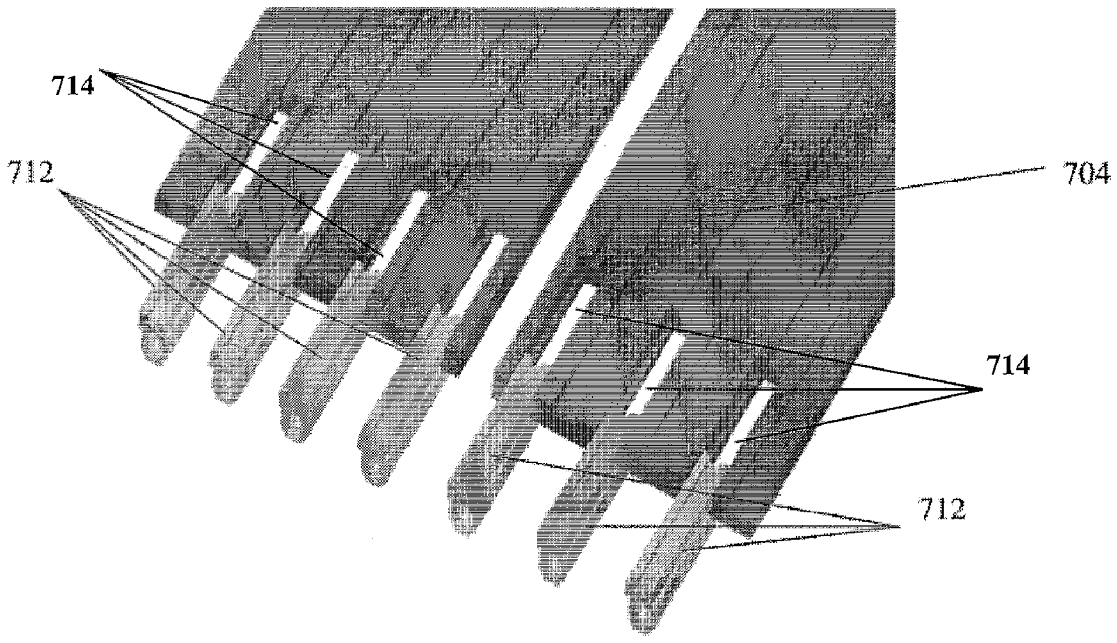

FIGS. 7A, 7B and 7C shows a transfer box 600 according to an embodiment of the present invention. The transfer box includes a front door 700, a front door actuator 702 configured to move the front door 700 between open and closed positions, a base 704, side walls 706 extending upwardly from opposite sides of the base, a backwall 708 consisting of a number of vertical bars with fingers protruding towards the front door 700, a backwall screw drive 710 configured to move the backwall according to the depth of the mail and bridge fingers 712 that are retractable and extend outwardly from base 704 at the front of the transfer box 600. The transfer box 600 has two positions: open and closed. In the open position, the front door 700 is lowered by the front door actuator 702 to permit mail to be loaded between the side walls 706 of the transfer box 600. In the closed position, the front door 700 is elevated to form a barrier preventing mail from being discharged from the transfer box 600.

The transfer box 600 is in an open position when it is being loaded with mail or unloading mail. When mail is being loaded into the transfer box 600, the mail is pushed into the box and held in place by the base 704 and the side walls 706. As the mail is being pushed into the box the backwall 708 is adjusted to accommodate the stack of mail. In an embodiment, the backwall 708 is attached to a backwall screw drive 710 so it will slide back automatically as the stack of mail is pushed in, yet still have enough resistance to keep the stack of mail upright.

In an embodiment, retractable bridge fingers 712 in slots 714 are added along the front edge of the base 704. The bridge fingers 712 can be in a retracted position while the transfer box 600 is in a closed position. When the transfer box 600 is in an open position, the bridge fingers 712 can be made to extend forwardly from the front edge of the transfer box 600 so as to act like a bridge for the mail to move across as it is being loaded or unloaded. The bridge fingers 712 prevent mail from falling In another embodiment, the undercut of the bridge fingers 712 is increased which has the advantages of eliminating the impact of the bridge fingers 712 on other surfaces (such as the verticalizer 220 or ACT loader 212) and this results in a reduction of noise as the bridge fingers 712 are extended Another problem can be improper torquing and side loads on the cylinder of the front door actuator 702. A solution to the side load problem is to provide the front door actuator 702 rodded cylinder with an external rail and bearing carriage. This effectively eliminates side loads on the cylinder. A solution to the improper torquing is to mount the front door actuator 702 to an aluminum plate on the side wall 706. Another problem can be improper torquing of the transfer box 600 fasteners. A solution to this problem is making the baseplate 704 with a Teflon-impregnated hard-coated aluminum. Using this material allows for proper torquing of the fasteners.

Figure 8A:
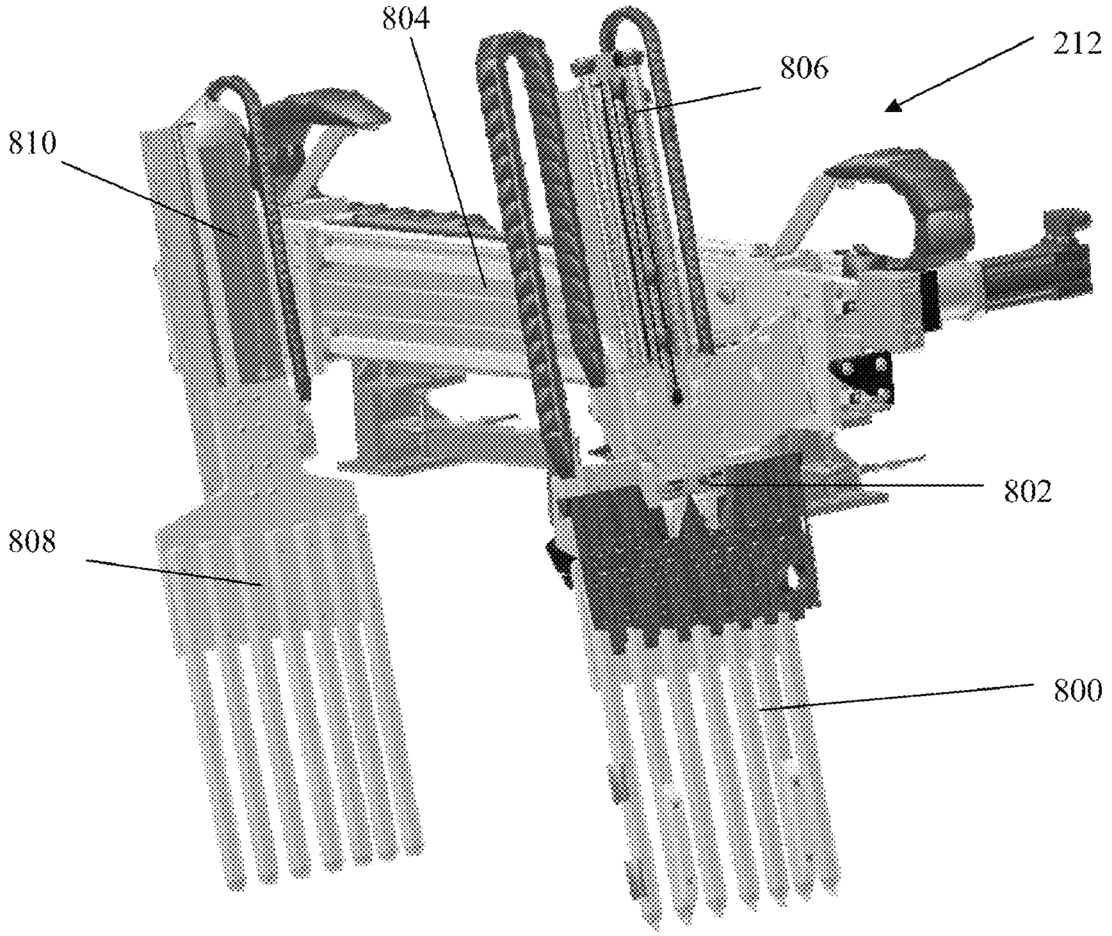
FIGS. 8A and 8B are perspective views of an ACT loader for an integrated tray converter according to an embodiment of the present invention.
Figure 8B:
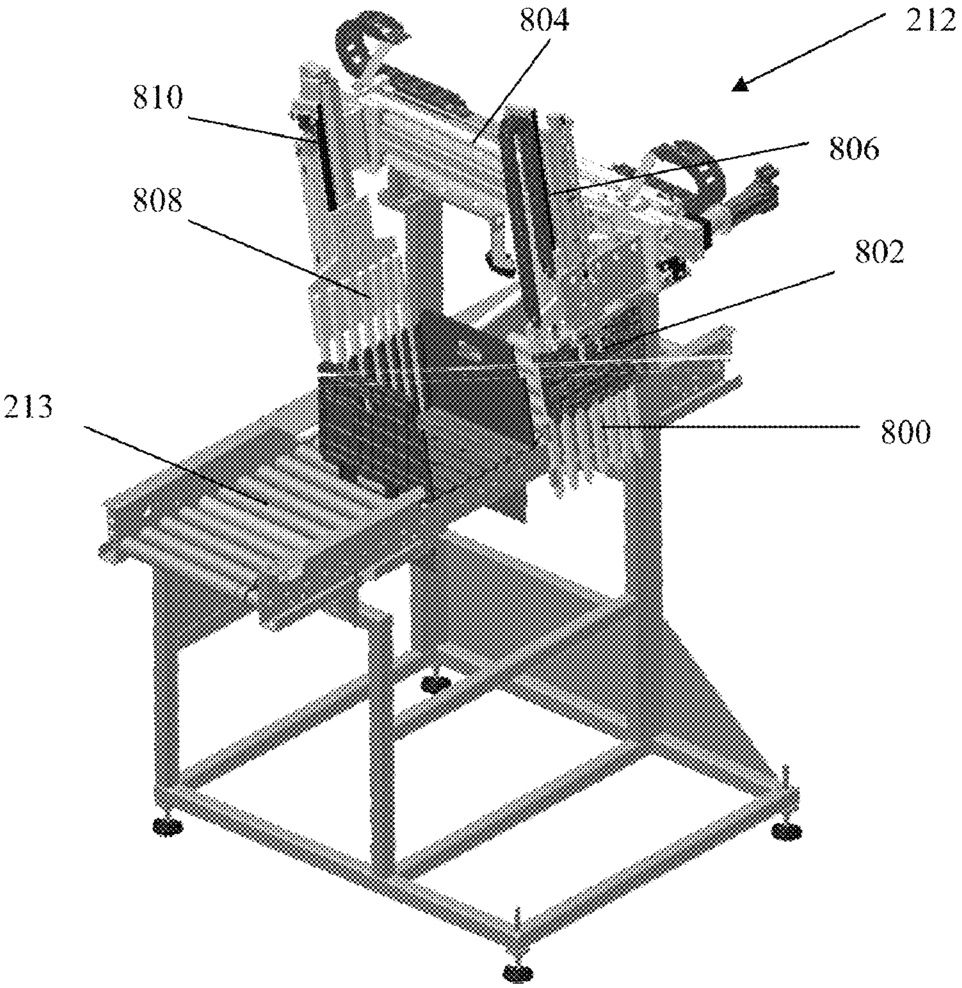

FIGS. 8A and 8B shows an ACT Loader 212 according to an embodiment of the present invention. The ACT Loader 212 includes an auto paddle 800 that consists of a number of tines, a door gripper assembly 802, an x-axis actuator 804, a wire track 806, a backstop 808 consisting of a number of tines and a z-axis actuator 810. The ACT Loader 212 unloads mail that is going back into the sorting system from one of the transfer boxes 600. The ACT Unloader 212 starts in a position above the ACT conveyor 213. When an empty ACT moves into position under the ACT unloader 212, the auto paddle 800 moves down to the ACT and the door gripper assembly 802 grips the front door of the ACT. The auto paddle 800 and door gripper assembly 802 are moved vertically by the wire track 806. The auto paddle 800 and the door grip assembly 802 then move up from the ACT with the ACT door now in the door grip assembly 802 (FIG. 8B). When a transfer box 600 with mail going back to the sorting system arrives at the ACT loader 212, the auto paddle 800 and the door grip assembly 802 are moved over the back of the transfer box 600 by the x-axis actuator 804. The backstop 808 is then moved by the x-axis actuator 804 to the front of the transfer box 600. When the transfer box 600 is in an open position, the auto paddle 800 and the backstop 808 are moved down so that the auto paddle 800 is on the side of the mail farthest from the ACT and the backstop 808 is on the side of the mail closest to the ACT. The auto paddle 800 and the backstop 808 move the mail from the transfer box 600 to the ACT and the gripper assembly 802 puts the front of the ACT back on. The auto paddle 800 and the backstop 808 are then moved up, away from the ACT, and the filled ACT is conveyed towards the sorting system. Also note that there are jam sensors located on the auto paddle 800 and the back paddle 808 that alert the system if there is a jam.

In an embodiment, there can be a label scanner on the ACT loader 212 that allows for the system to keep track of the mail being loaded into the ACT. In an embodiment, the tips of the auto paddle tines extend below the bottom of the transfer box 600 and ACT base. This prevents mail from becoming jammed under the tines and improves reliability when loading ACTs. Also, increasing the rigidity of the frame by shortening the frame length and adding support to the frame helps to prevent the frame of the ACT Loader 212 from flexing when it is loading mail into ACTs.

Figure 9:
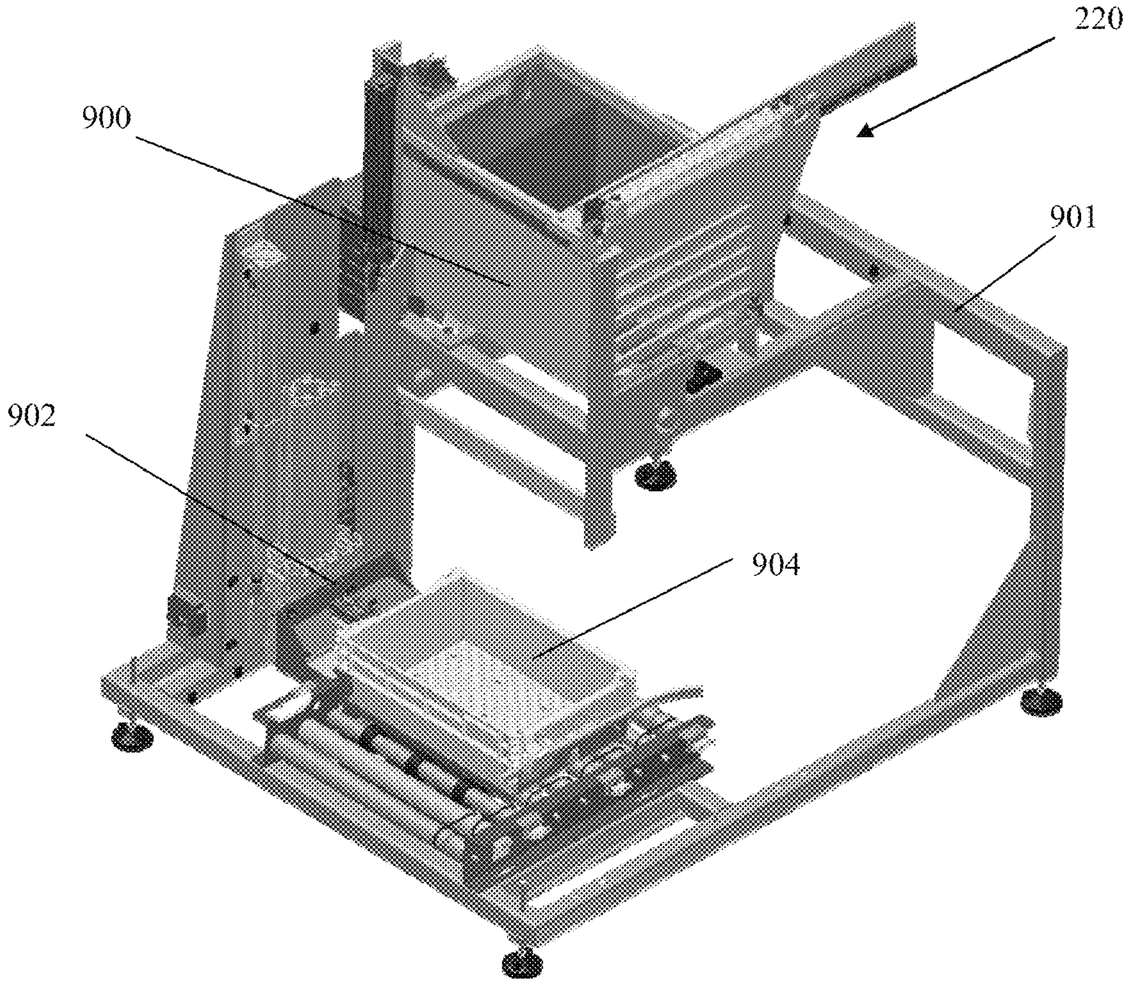
FIG. 9 is a perspective view of a verticalizer for an integrated tray converter according to an embodiment of the present invention.

FIG. 9 shows a verticalizer 220 according to an embodiment of the present invention. The verticalizer includes a rotate box 900 mounted for rotation on a frame 901 and a street tray lift 902 mounted on the frame underneath the rotate box. Mail from one of the transfer boxes 600 that is intended for the dispatch output is transferred into the rotate box 900 in a generally upright or vertical orientation. The rotate box 900 turns ninety degrees counterclockwise about an axis parallel to the direction of travel of the mail (such that the edge of the mail that was previously on the bottom is now on the side). The mail is now properly oriented to be placed in a street tray 904. The street tray lift 902 lifts an empty street tray 904 to the rotated rotate box 900 which drops the mail into the tray. The filled tray is then lowered by the street tray lift 902 and proceeds towards the dispatch.

Figure 10:
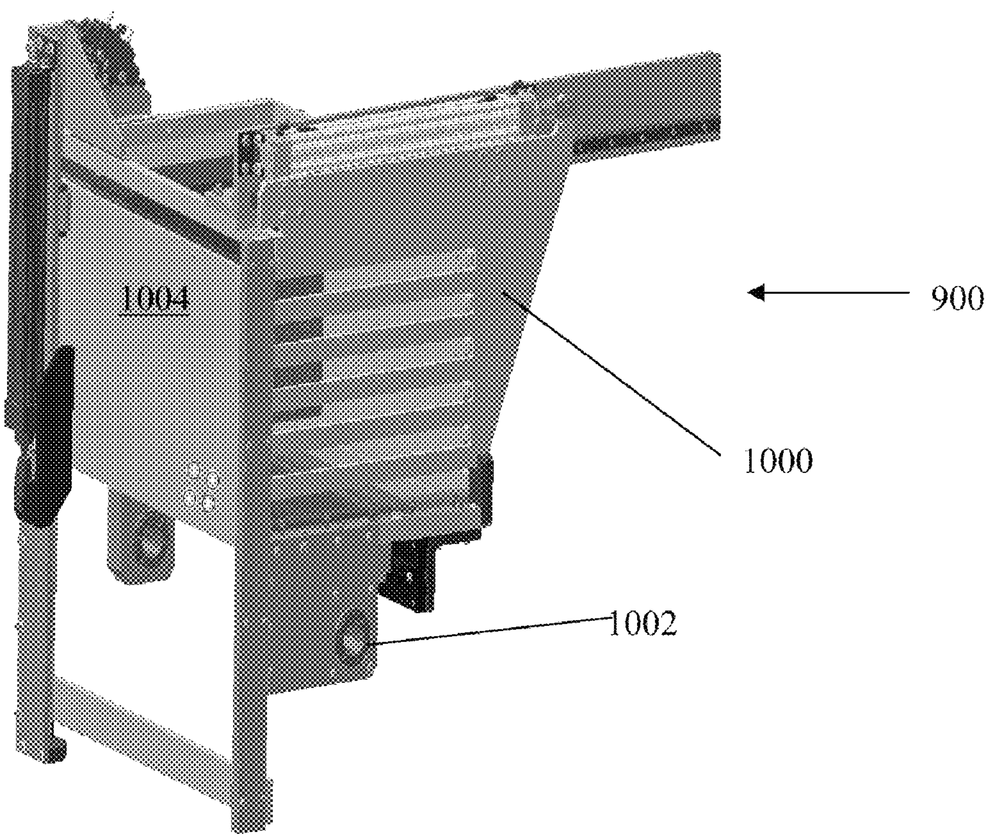
FIG. 10 is a perspective view of a rotating box for an integrated tray converter according to an embodiment of the present invention.

FIG. 10 shows a rotate box 900 according to an embodiment of the present invention. The rotate box includes a door 1000, a screw drive 1002 and a slip sheet 1004. The door 1000 moves horizontally into an open position to allow mail from the indexing table's 210 transfer box 600 to be loaded into the rotate box 900. The front door 1000 then moves back into a closed position and the rotate box 900 is rotated ninety degrees counter clockwise by the screw drive 1002 so the slip sheet 1004 is on the bottom. The slip sheet 1004 is then pulled away from under the mail to allow the mail to drop into a street tray.

Figure 11:
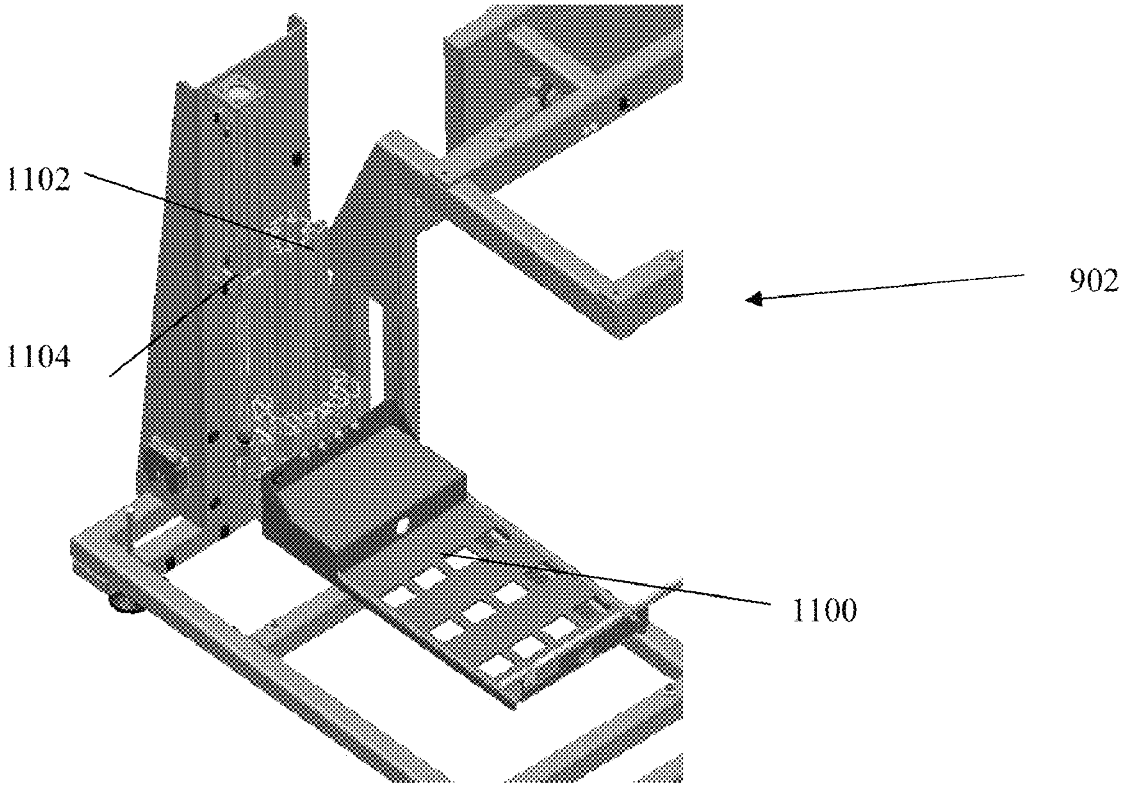
FIG. 11 is a perspective view of a street tray lift for an integrated tray converter according to an embodiment of the present invention.

FIG. 11 shows the street tray lift 902 according to an embodiment of the present invention. The street tray lift 902 includes a street tray lift plate 1100, a guide rail 1102 and a street tray lift actuator 1104. The street tray life plate 1100 accepts an empty street tray. The street tray lift plate 1100 and the empty street tray are then elevated along the guide rail 1102 by the street tray lift actuator 1104. The rotate box 900 drops mail into the empty street tray. The filled tray then descends and is transferred towards dispatch.

Figure 12:
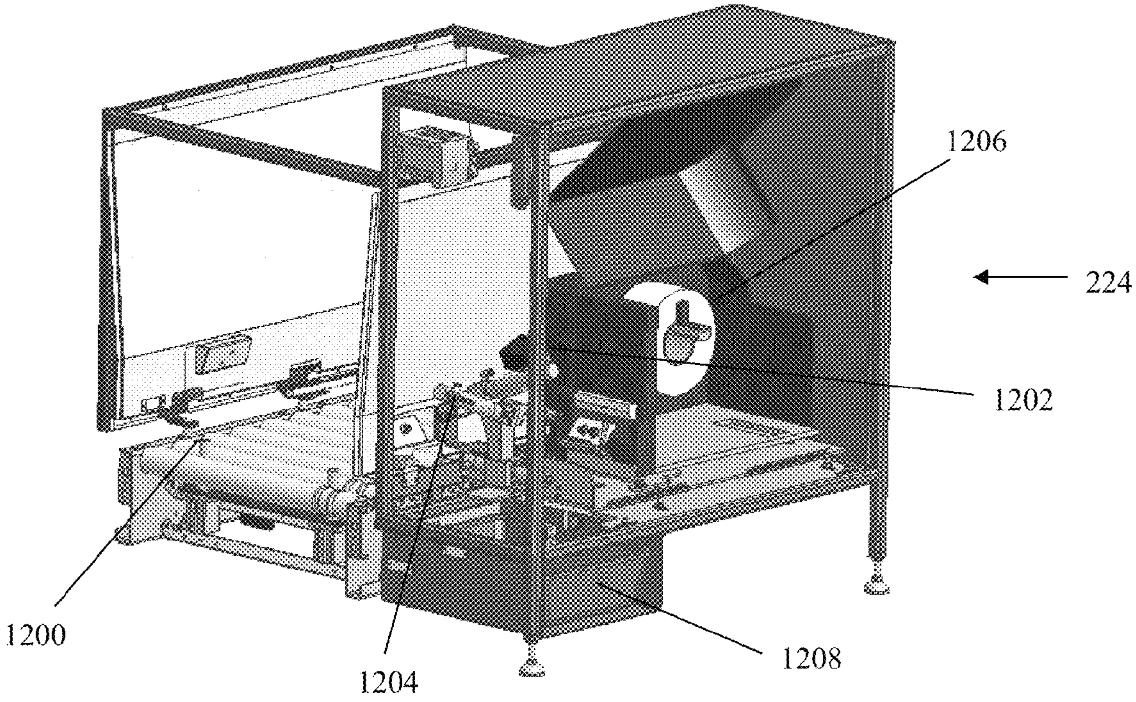
FIG. 12 is a perspective view of a street tray labeler for an integrated tray converter according to an embodiment of the present invention.

FIG. 12 shows a street tray labeler 224 according to an embodiment of the present invention. The street tray labeler 224 includes a tray stop 1200, a label scanner 1202, a label applicator 1204, a printer 1206 and a label discard tray 1208. A filled street tray enters the street tray labeler 224 and is stopped by the tray stop 1200. The label on the mail is scanned by the label scanner 1202 to see where the tray is destined. The label applicator 1204 then applies a label produced by the printer 1206.

Figure 13:
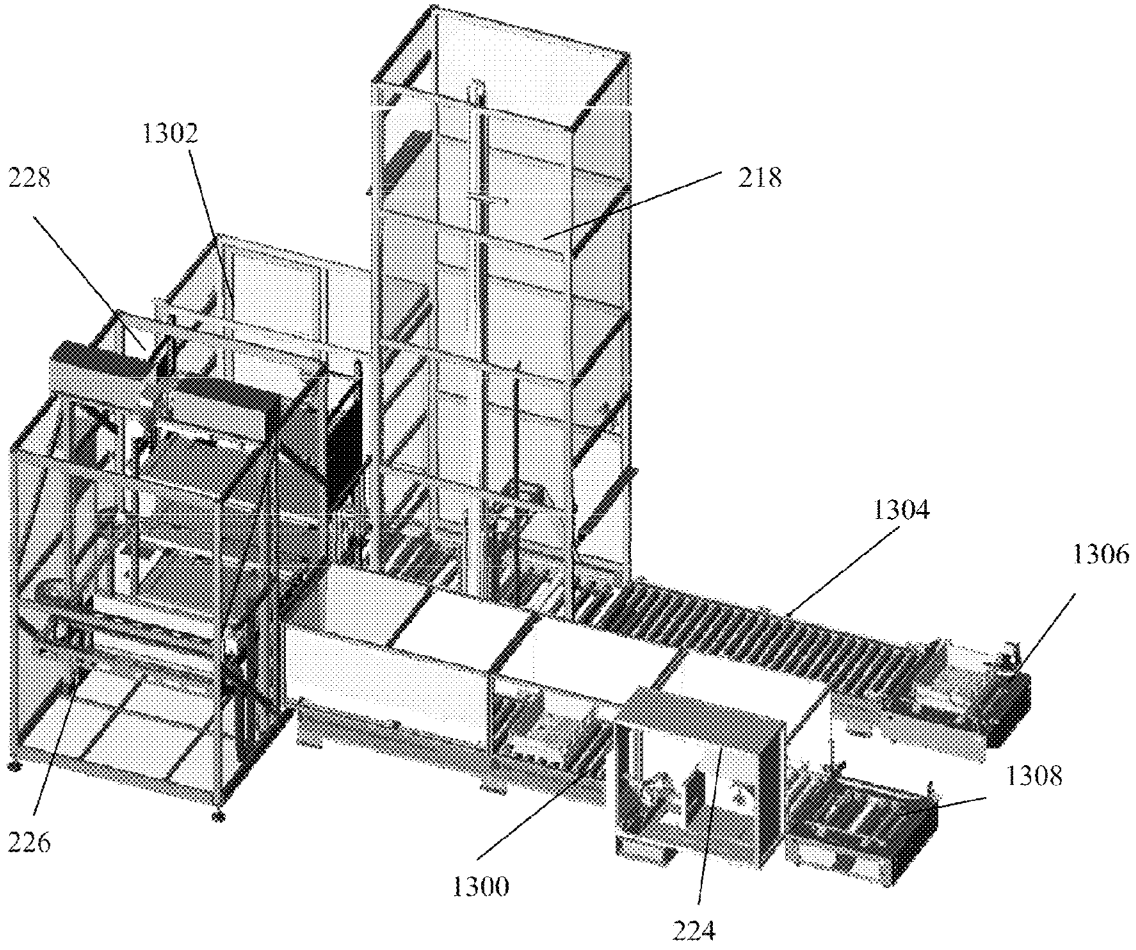
FIG. 13 is a perspective view of a CASTR subsystem for an integrated tray converter according to an embodiment of the present invention.

FIG. 13 shows a Carrier Automated Street Tray Rack (CASTR) subsystem according to an embodiment of the present invention. The CASTR subsystem includes a filled street tray conveyor 1300, a vertical positioning and pushing device (VPPD) 226, a CASTR cart 228, an empty buffer matrix 1302, an empty street tray conveyor 1304 an empty street tray turntable 1306 and a filled street tray turntable 1308. A filled street tray is transported to the VPPD 226 by the filled street tray conveyor 1300. The VPPD 226 can accept up to three filled street trays. The VPPD 226 lifts the filled street trays to a desired shelf in the CASTR cart 228, and then pushes the trays onto the cart shelf. The CASTR cart 228 is initially filled with empty street trays. When the filled street trays are pushed onto the cart shelves by the VPPD 226, the empty street trays in the CASTR cart 228 are pushed into the empty buffer matrix 1302.

The empty buffer matrix 1302 transfers the empty street trays to the empty street tray conveyor 1304. The empty street tray conveyor transports the empty street tray to the empty street tray turntable 1306. The empty street tray turntable 1306 turns the empty street tray ninety degrees and transfers it to the verticalizer 220. Once the street tray is filled by the verticalizer 220, the filled street tray is transferred to the filled street tray turntable 1308. The filled street tray turntable 1308 turns the filled street tray ninety degrees and transports the filled street tray to the street tray labeler 224. Once the filled street tray has been labeled by the street tray labeler 224, the tray is transferred to the filled tray conveyor 1300.

From the above, it will be appreciated that the system and method of the present invention facilitates automation of a multiple pass mail sorting method by automatically converting mail from a first type of tray to one of a plurality of different types of tray. It will also be appreciated that various changes can be made to the system and method without departing from the spirit and scope of the appended claims. For example, while four transfer boxes are shown on the indexing table in the figures, fewer or more than four boxes can be used while still remaining within the spirit and scope of the appended claims.

What is claimed:

1. A system for converting mail from a first type of tray to another type of tray in a multiple pass mail sorting system having a sorting input and a sorting output, comprising:

an unloader positioned downstream of the sorting output;

a stacker positioned downstream of the unloader;

an indexing apparatus positioned downstream of the unloader; and a controller in communication with said unloader, said stacker and said indexing apparatus to cause said unloader to remove mail from a first type of tray and to cause said indexing apparatus to separate the mail into a plurality of stacks of one or more depths and transfer the stacks to one of a plurality of tray outputs where the stacks of mail are placed in one of the other types of tray.

2. The system of claim 1, wherein said indexing apparatus has multiple containers which are movable between a plurality of output stations.

3. The system of claim 2, wherein said multiple containers of said indexing apparatus are configured to rotate about an axis of rotation.

4. The system of claim 2, wherein said indexing apparatus includes a rotating turntable and wherein said multiple containers are mounted on said turntable such that when one of said containers is in a loading position at least one of the other containers is in an unloading position at one of said output stations.

5. The system of claim 2, wherein each of said containers include a front wall movable between an open position for unloading/loading mail and a closed position.

6. The system of claim 5, wherein said front wall of each of said containers is capable of sliding between open and closed positions.

7. The system of claim 2, wherein each of said containers includes a backstop that is movable to adjust for multiple depths.

8. The system of claim 7, wherein said backstop in each of said containers is movable to match a depth of the mail stack.

9. The system of claim 7, wherein said backstop in each of said containers includes a plurality of fingers at vertically and horizontally spaced positions for engaging the mail stack.

10. The system of claim 2, wherein each of said containers includes a bottom with one or more slots and one or more retractable arms that is movable in the slot so as to extend outwardly from a front of said container to act as a floor for mail being loaded into or unloaded from said container.

11. The system of claim 1, wherein said stacker includes a mail supporting surface with a plurality of openings formed there through and a plurality of prongs movable through the openings in said surface to stack mail within said stacker.

12. The system of claim 11, wherein said stacker has an actuator that assists said prongs in stacking the mail.

13. The system of claim 1, wherein said indexing apparatus includes a paddle movable between a first position spaced from the first stack of mail and a second position interposed in the stack of mail for separating the mail and loading it into said indexing apparatus.

14. The system of claim 1, wherein said indexing apparatus is configured to separate the mail into a plurality of smaller stacks of equal depth based on an assigned output tray and the total depth of the mail to be separated.

* * * * *